United States Patent
Klecka et al.

(10) Patent No.: US 10,376,961 B2
(45) Date of Patent: Aug. 13, 2019

(54) POWDER SPHEROIDIZING VIA FLUIDIZED BED

(71) Applicant: United Technologies Corporation, Hartford, CT (US)

(72) Inventors: Michael A. Klecka, Coventry, CT (US); Ying She, East Hartford, CT (US); Tahany Ibrahim El-Wardany, Bloomfield, CT (US); Aaron T. Nardi, East Granby, CT (US)

(73) Assignee: United Technologies Corporation, Farmington, CT (US)

( * ) Notice: Subject to any disclaimer, the term of this patent is extended or adjusted under 35 U.S.C. 154(b) by 723 days.

(21) Appl. No.: 15/021,575

(22) PCT Filed: Jul. 30, 2014

(86) PCT No.: PCT/US2014/048853
§ 371 (c)(1),
(2) Date: Mar. 11, 2016

(87) PCT Pub. No.: WO2015/023438
PCT Pub. Date: Feb. 19, 2015

(65) Prior Publication Data
US 2016/0221084 A1 Aug. 4, 2016

Related U.S. Application Data

(60) Provisional application No. 61/980,681, filed on Apr. 17, 2014, provisional application No. 61/864,912, filed on Aug. 12, 2013.

(51) Int. Cl.
*B22F 9/04* (2006.01)
*B01J 8/18* (2006.01)
(Continued)

(52) U.S. Cl.
CPC ....... *B22F 9/04* (2013.01); *B01J 2/16* (2013.01); *B01J 8/1836* (2013.01);
(Continued)

(58) Field of Classification Search
CPC .. B01J 8/1836; B01J 2/16; B01J 2208/00061; B01J 2208/00504; B01J 2208/0053;
(Continued)

(56) References Cited

U.S. PATENT DOCUMENTS

| 3,615,187 A | 10/1971 | Suzukawa et al. |
| 4,749,398 A * | 6/1988 | Braun ............... B01J 2/16 425/90 |

(Continued)

FOREIGN PATENT DOCUMENTS

| CH | 664297 A5 | 2/1988 |
| CN | 101869981 A | 10/2010 |

(Continued)

OTHER PUBLICATIONS

Second Office Action from Chinese Patent Application No. 201480038644.8, dated Aug. 30, 2017, 14 pages.

(Continued)

*Primary Examiner* — Daniel C. McCracken
(74) *Attorney, Agent, or Firm* — Kinney & Lange, P.A.

(57) ABSTRACT

One embodiment includes a powder spheroidizing method. The method includes loading a powder into a fluidized bed assembly, fluidizing at least some of the powder in the fluidized bed assembly using an inert gas, and heating the powder while fluidized in the fluidized bed assembly.

15 Claims, 6 Drawing Sheets

(51) Int. Cl.
*B22F 1/00* (2006.01)
*B01J 2/16* (2006.01)
*B33Y 10/00* (2015.01)
*B33Y 70/00* (2015.01)

(52) U.S. Cl.
CPC .......... *B22F 1/0048* (2013.01); *B22F 1/0085* (2013.01); *B01J 2208/0053* (2013.01); *B01J 2208/00061* (2013.01); *B01J 2208/00504* (2013.01); *B22F 2201/02* (2013.01); *B22F 2201/11* (2013.01); *B22F 2999/00* (2013.01); *B33Y 10/00* (2014.12); *B33Y 70/00* (2014.12)

(58) Field of Classification Search
CPC ........ B22F 1/0048; B22F 1/0085; B22F 9/04; B22F 2999/00; B22F 2201/10; B22F 3/003; B22F 2201/02; B22F 2201/11; B33Y 10/00; B33Y 70/00
USPC ........................................................ 422/146
See application file for complete search history.

(56) References Cited

U.S. PATENT DOCUMENTS

| | | | |
|---|---|---|---|
| 4,784,069 A * | 11/1988 | Stark .................. | C10G 9/20 110/211 |
| 5,073,358 A | 12/1991 | Shimizu et al. | |
| 5,213,820 A | 5/1993 | Uhlemann et al. | |
| 5,976,456 A | 11/1999 | Ziani et al. | |
| 6,109,342 A | 8/2000 | Klaren | |
| 6,156,821 A | 12/2000 | Cantarini | |
| 6,186,658 B1 | 2/2001 | Nishida et al. | |
| 6,251,158 B1 | 6/2001 | Dube et al. | |
| 6,428,600 B1 | 8/2002 | Flurschutz et al. | |
| 6,811,765 B1 | 11/2004 | Maiwald et al. | |
| 6,893,994 B2 | 5/2005 | Wallar | |
| 7,141,207 B2 | 11/2006 | Jandeska, Jr. et al. | |
| 7,547,419 B2 | 6/2009 | Sprouse et al. | |
| 7,951,416 B2 | 5/2011 | Heinrich et al. | |
| 8,192,792 B2 | 6/2012 | Haynes et al. | |
| 8,399,599 B2 | 3/2013 | Hackl et al. | |
| 8,444,723 B2 | 5/2013 | Fujimori et al. | |
| 2006/0045787 A1 | 3/2006 | Jandeska, Jr. et al. | |
| 2007/0267784 A1 | 11/2007 | Greiner | |
| 2009/0123665 A1 | 5/2009 | Zaima | |
| 2012/0328465 A1 | 12/2012 | Eder et al. | |

FOREIGN PATENT DOCUMENTS

| | | |
|---|---|---|
| CN | 102134413 A | 7/2011 |
| EP | 0280789 A1 | 9/1988 |
| JP | H07163945 A | 6/1995 |
| KR | 1020020005039 A | 1/2002 |
| WO | WO8700827 A1 | 2/1987 |
| WO | 95/30503 A1 | 11/1995 |
| WO | 97/01651 A1 | 1/1997 |
| WO | WO03004143 A1 | 1/2003 |
| WO | 2012146048 A1 | 11/2012 |

OTHER PUBLICATIONS

Extended European Search Report for EP Application No. 14836856.3, dated Aug. 22, 2016, 7 pages.

International Search Report and Written Opinion from PCT Application Serical No. PCT/US2014/048853, dated Nov. 25, 2014, 11 pages.

William T. Carter, Jr. et al., "Direct Laser Sintering of Metals", General Electric Corporate Research & Development Center, pp. 51-59.

M. Shellabear et al., "DMLS—Development History and State of the Art", Presented at LANE 2004 conference, Erlanged German, Sep. 21-24, 2004, 12 pages.

* cited by examiner

POWDER SPHEROIDIZING VIA FLUIDIZED BED

STATEMENT OF GOVERNMENT INTEREST

The U.S. Government has a paid-up license in this invention and the right in limited circumstances to require the patent owner to license others on reasonable terms as provided for by the terms of Contract No. DE-AR-0000308 awarded by Department of Energy.

BACKGROUND

The present embodiments relate generally to the field of additive manufacturing and, more particularly, to pre-treatment of powders used in additive manufacturing processes, such as with the use of fluidized beds.

Various additive manufacturing processes, as well as traditional powder processing and consolidation methods, rely on flowability of powders for proper application. Flowability of powders is a function of both powder size and shape. As powder size decreases, powder feeding becomes more difficult. Furthermore, powders with jagged or sharp shapes tend to interlock, disrupting powder flow. Therefore, the preferred powder shape is spherical, as this powder shape results in improved powder flow and consequently improved consistency in an additive build.

Powders are manufactured in numerous ways. One such powder manufacturing method is atomization, which is common for metal powders. Atomization can include both water atomization and gas atomization. Water atomization is generally cost effective but produces generally jagged granular powders. Gas atomization may produce more spherical powders, but is a less cost effective means for manufacturing powders. Other powder manufacturing methods, such as rotary atomization and plasma rotating electrode process (PREP), are even more costly than gas atomization. Another powder manufacturing technique, common for glass and ceramic powders, involves crushing or grinding. A ground ceramic or glass powder typically will be very jagged in shape, making flow difficult.

One prior method used to morph jagged or sharp powders into more spherical shapes is known as plasma spheroidization. Plasma spheroidization involves directing powders through a plasma jet, with the high plasma heat acting to spheroidize some of the powders and the jet stream acting to prevent agglomeration or sintering of powders. However, plasma spheroidization is very costly and presents challenges in selecting proper processing parameters. Furthermore, the extreme heat of the plasma can influence alloying element concentrations in powders, often vaporizing, and thus removing, low melt point elements as well as altering concentrations of other elements.

SUMMARY

One embodiment includes a powder spheroidizing method. The method includes loading a powder into a fluidized bed assembly, fluidizing at least some of the powder in the fluidized bed assembly using an inert gas, and heating the powder while fluidized in the fluidized bed assembly.

Another embodiment includes a powder spheroidizing apparatus for spheroidizing a powder. The apparatus includes a fluidized bed assembly, a heat source for introducing heat into the fluidized bed assembly, a powder within the fluidized bed assembly, and a plate disposed within the fluidized bed assembly.

A further embodiment includes a method for spheroidizing powder. The method includes loading a powder into a fluidized bed assembly. At least some of the powder in the fluidized bed assembly is fluidized using an inert gas. The powder is heated while fluidized in the fluidized bed assembly to a temperature ranging between a temperature at or above which the powder softens and below a melting point of the powder. The powder is heated until substantially all particles of the powder are spheroidized. The powder is removed from the fluidized bed assembly, and an article is additively manufactured using the powder removed from the fluidized bed assembly.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, the present embodiments provide apparatuses and methods for spheroidization of powder. To improve powder flow, and therefore the quality of an article being built during an additive build, it is beneficial to use powder that is generally spherical in shape. The present embodiments provide for morphing the shape of powder from jagged or sharp particles to more generally spheroid particles. This morphing of powder shape to a spheroid or substantially spheroid shape is known as spheroidization. Powder is loaded into a fluidized bed and fluidized using an inert gas. Heat is applied to the fluidized powder which causes powder particles to morph from jagged to generally spheroid in shape, while the fluidization of the powder reduces a risk that powder particles agglomerate or sinter together.

This application claims priority to U.S. provisional application Ser. No. 61/864,912 filed on Aug. 12, 2013 and Ser. No. 61/980,681 filed on Apr. 17, 2014, the disclosures of which are incorporated by reference herein in their entirety.

Figure 1:
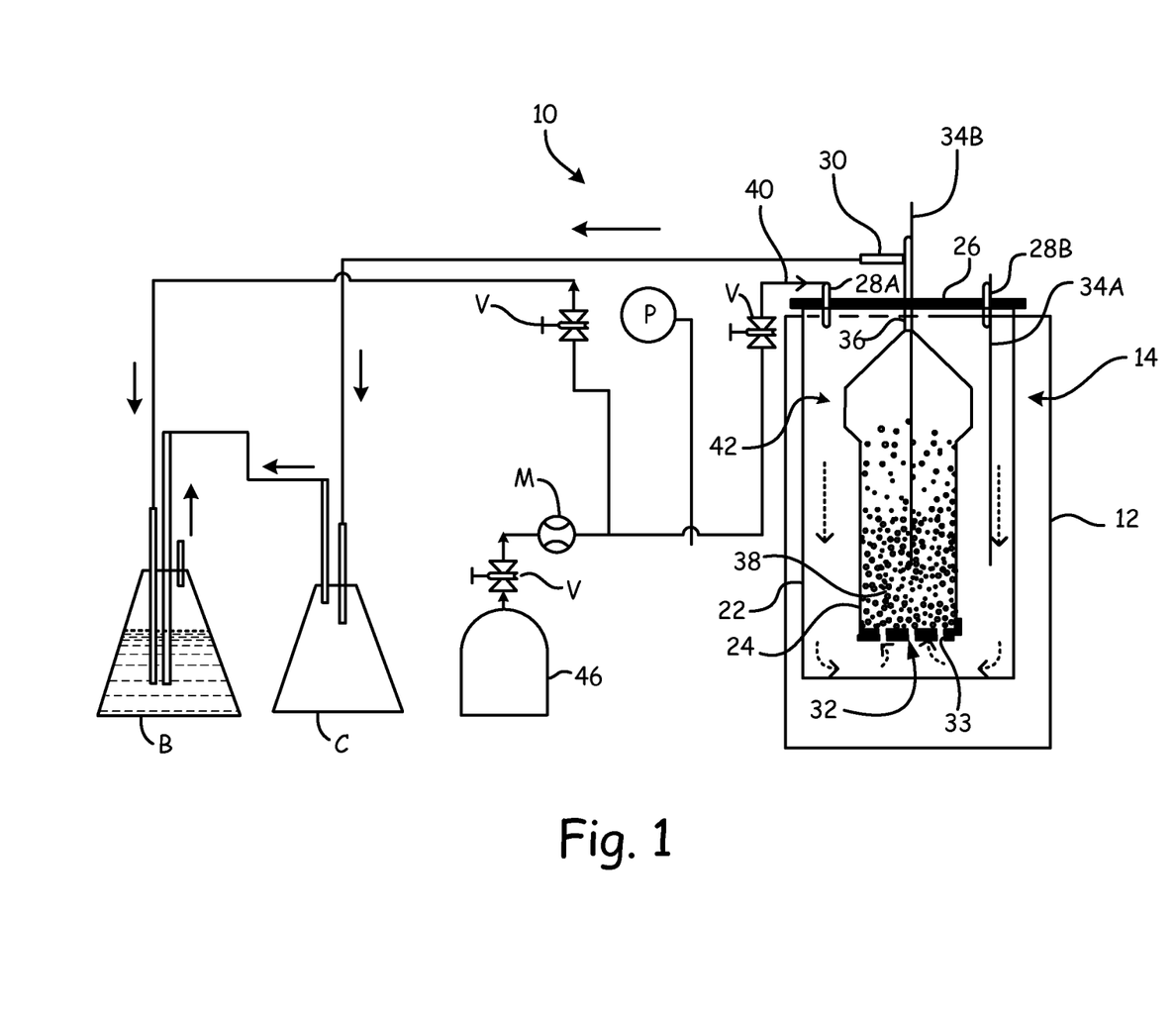
FIG. 1 is a schematic, cross-sectional view of an embodiment of a powder spheroidization apparatus.

FIG. 1 is a schematic, cross-sectional view of powder spheroidization apparatus 10. Powder spheroidization apparatus 10 includes furnace 12, fluidized bed assembly 14, outer chamber 22, inner chamber 24, cover 26, first inlet 28A, second inlet 28B, outlet 30, plate (i.e. disk) 32, first temperature sensor 34A, second temperature sensor 34B, tube 36, powder 38, gas 40, disengaging section 42, gas source 46, valves V, pressure gauge P, mass flow controller M, powder collector C, and liquid bubbler B.

Furnace 12 has fluidized bed assembly 14 disposed at least partially within furnace 12. Furnace 12 can have any suitable configuration. In various embodiments, furnace 12 can be a box furnace or a tube furnace that can be loaded and unloaded via a top-end opening. In another embodiment furnace 12 can simply include one or more discrete heaters (e.g., electrical heaters) wrapped around outer chamber 22. In another embodiment, furnace 12 can be an oven. In one embodiment, furnace 12 is capable of reaching an internal temperature of over 1100° C. (2012° F.).

Fluidized bed assembly 14 includes, among other components, outer chamber 22 and inner chamber 24. Outer chamber 22 is mounted at least partially within furnace 12 in any suitable fashion. In one embodiment, outer chamber 22 is fabricated from a ceramic material. Outer chamber 22 can, however, be fabricated from any material capable of withstanding high heat without oxidation. Inner chamber 24 is disposed within outer chamber 22. In the embodiment of FIG. 1, inner chamber 24, also known as a retort, is suspended from cover 26 so that space is provided between outer chamber 22 and an entirety of the exterior of inner chamber 24. Inner chamber 24 is suspended from cover 26 by tube 36 that connects inner chamber 24 to outlet 30. Inner chamber 24 can be fabricated from stainless steel, such as a 300 series stainless steel. Cover 26 can be releasably attached to outer chamber 22 such that inner chamber 24 can be accessed inside of outer chamber 22.

Inlets 28A and 28B extend through cover 26 and into outer chamber 22 and one or both of inlets 28A and 28B can be in fluid connection with gas source 46. Outlet 30 is in fluid connection with tube 36 and provides a means for gas 40 to exit fluidized bed assembly 14. Plate 32 is removably attached to a lower end of inner chamber 24. Plate 32 can be a porous disk, screen, filter or any other type of plate through which gas 40 can pass. Pores or holes 33 in plate 32 must generally be smaller than powder 38 size such that powder 38 does not fall through plate 32. Furthermore, small pores or holes 33 in plate 32 also help to distribute gas 40 passing through plate 32 evenly. Temperature sensors 34A and 34B are located at least partially within outer chamber 22 and inner chamber 24, respectively. Temperature sensors 34A and 34B can be used to determine the temperature of gas 40 and powder 38, respectively, and can also be used to determine the need for and magnitude of heat from furnace 12. Tube 36 is in fluid connection with inner chamber 24 and, in conjunction with outlet 30, provides an exit means for both powder 38 and gas 40.

In the embodiment shown in FIG. 1, powder 38 can be loaded into inner chamber 24 via tube 36 and can be evacuated from inner chamber 24 via passing relatively high velocity gas 40 through plate 32 and ultimately through tube 36 after processing of powder 38 in fluidized bed assembly 14. Powder 38 can be metal, ceramic, glass, polymer, or any other type of material that can be made into a powder and used in additively manufacturing an article. Powder 38 can be all the same powder material or a mixture of different powder materials.

Gas 40 can be any inert gas, such as nitrogen or argon, which can help reduce or prevent oxidation of powder 38. Gas 40 can be pressurized and is supplied by gas source 46 and enters outer chamber 22 through inlet 28A, such that gas 40 surrounds inner chamber 24, including at plate 32. Gas 40 passes through plate 32 and percolates through powder 38, eventually leaving inner chamber 24 through tube 36 at outlet 30. As gas 40 passes through plate 32 it serves as an agitation source, which lifts particles of powder 38 off of plate 32 and helps reduce or prevent particles of powder 38 from sintering or agglomerating within inner chamber 24 due to the heat applied by furnace 12. Due to the mass of each particle of powder 38, the particles of powder 38 agitated by gas 40 eventually drop back down toward plate 32. To aid in this process, inner chamber 24 can include disengaging section 42 that increases a width, or if circular, diameter, of inner chamber 24 to help slow a velocity of gas 40 and/or powder 38 near tube 36 (i.e. Bernoulli's principle that with a decrease in velocity comes a simultaneous increase in pressure), which decreases momentum of the particles to allow gravity to return them toward plate 32. Thus, particles of powder 38 can substantially continuously circulate from plate 32, up toward tube 36, and back down toward plate 32 as long as gas 40 is passed through inner chamber 24. This substantially continual circulation of powder 38 inside inner chamber 24 due to gas 40 can provide fluidization of powder 38. More generally, any suitable action that causes powder 38 to behave like a gas can provide fluidization.

Gas source 46 supplies gas 40 to inlet 28A. Powder spheroidization apparatus 10 can include valves V, mass flow controller M, and pressure gauge P to control an amount, flow rate, and pressure of gas 40 supplied to outer chamber 22 through inlet 28A. The flow rate of gas 40 can be increased to controllably direct powder 38 up through tube 36. The flow rate of gas 40 must generally be sufficiently high enough to keep powders 38 fluidized in fluidized bed assembly 14 and can be determined based on powder 38 properties (e.g., particle size, shape (and thus drag), and/or density), gas 40 properties (e.g., density and viscosity), and operating conditions (e.g., temperature and pressure). For example, for more dense powder 38 particles a greater flow rate of gas 40 can be used. However, for more jagged powder 38 particles a lower flow rate of gas 40 can be used. A bleed line can be included to assist in bleeding off any excess gas 40. Collector C is in fluid connection with outlet 30 and serves to collect both powder 38 and gas 40 that exits from inner chamber 24. Gas 40 is then transferred from collector C to bubbler B, which are in fluid connection, where gas 40 is then released from powder spheroidization apparatus 10, while some of powder 38 stays in collector C where powder 38 can be removed and used to additively manufacture an article. Bubbler B can capture any stray particles of powder 38 that leave collector C. In other embodiments, powder 38 can be removed from inner chamber 24 simply by removing cover 26.

Powder spheroidization apparatus 10 works to help spheroidize powder 38 (i.e. morph powder 38 shape from sharp or jagged to generally spheroidal). Powder 38 is loaded into inner chamber 24 of fluidized bed assembly 14. Gas 40 is supplied into outer chamber 22 and flows through plate 32 into inner chamber 24 where it fluidizes powder 38. Heat is applied to fluidized bed assembly 14 by furnace 12 and heats fluidized powder 38. Outer chamber 22 is heated by furnace 12 via convection and radiation, and inner chamber 24 is heated by outer chamber 22 via convection. The temperature to which powder 38 is heated ranges between a temperature at or above which powder 38 softens and below a melting point temperature of powder 38. Thus, the temperature to which powder 38 is heated must be selected in order to produce sufficient softening of powder 38—the temperature must generally be high enough to soften powder 38 but not so high as to fully melt powder 38. In general, heat can be applied to powder 38 for a duration anywhere from one to twelve hours, although this duration can be longer or shorter depending on powder 38 material.

Heating powder 38 to a temperature within this range softens powder 38 and results in jagged powder 38 tending to a more spherical shape, i.e. spheroidizes powder 38. This is because the preferred energy state of powder 38 particles is spherical, as this is the lowest energy shape and therefore reduces energy and surface area. At the same time powder 38 is heated, powder 38 is fluidized by gas 40. Fluidizing powder 38 prevents powder 38 particles from sintering or agglomerating together. Secondarily, the fluidizing of powder 38, and thus the bouncing around of powder 38 particles into each other in inner chamber 24, also assists in spheroidizing powder 38. Once substantially all powder 38 particles are spheroidized to a desired degree, the heating is terminated and powder 38 is removed from fluidized bed assembly 14. Powder 38 can then be used to additively manufacture an article.

Figure 2:
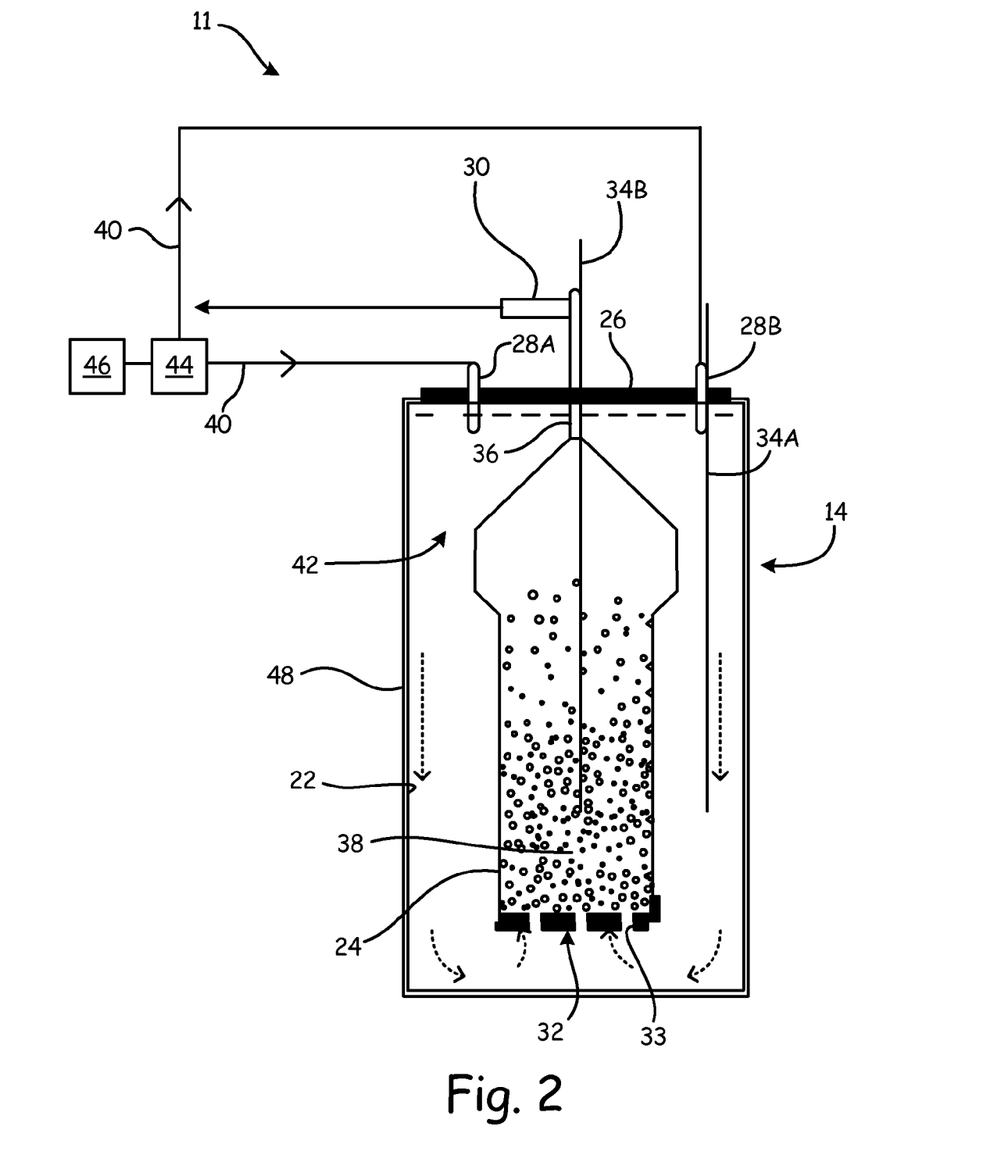
FIG. 2 is a schematic, cross-sectional view of another embodiment of a powder spheroidization apparatus.

FIG. 2 is a schematic, cross-sectional view of another embodiment of powder spheroidization apparatus 11. Powder spheroidization apparatus 11 includes elements similar to those shown and discussed with reference to FIG. 1 and such elements are numbered correspondingly. However, powder spheroidization apparatus 11 shown in FIG. 2 does not require furnace 12 to apply heat, but instead uses gas heater 44. Although, gas heater 44 and furnace 12 can be used together in further embodiments. Gas heater 44 can be an electric gas heater, heat exchanger, or any other device that can heat gas 40 to a desired temperature range to spheroidize powder 38. Powder spheroidization apparatus 11 can optionally include insulation 48 on or around outer chamber 22. Also, powder spheroidization apparatus 11 can introduce gas 40 into fluidized bed assembly 14 through both inlets 28A and 28B.

Gas heater 44 is in fluid connection with gas source 46. Gas heater 44 can heat gas 40 received from gas source 46 to a temperature ranging between a temperature at or above which powder 38 softens and below a melting point temperature of powder 38. Gas heater 44 can heat gas 40 to a temperature higher than this range if gas 40 cools as gas 40 travels from gas heater 44 to inner chamber 24. Heated gas 40 then enters fluidized bed assembly 14 and applies heat to powder 38, resulting in powder 38 spheroidizing as described for FIG. 1. While powder 38 is heated, powder 38 is also fluidized by gas 40 as described for FIG. 1. Powder spheroidizing apparatus 11 can further include valves V, mass flow controller M, pressure gauge P, collector C, and bubbler B as shown in FIG. 1, but not shown in FIG. 2 for simplicity. Powder 38 spheroidized in powder spheroidization apparatus 11 can be used to additively manufacture an article.

Figure 3A:
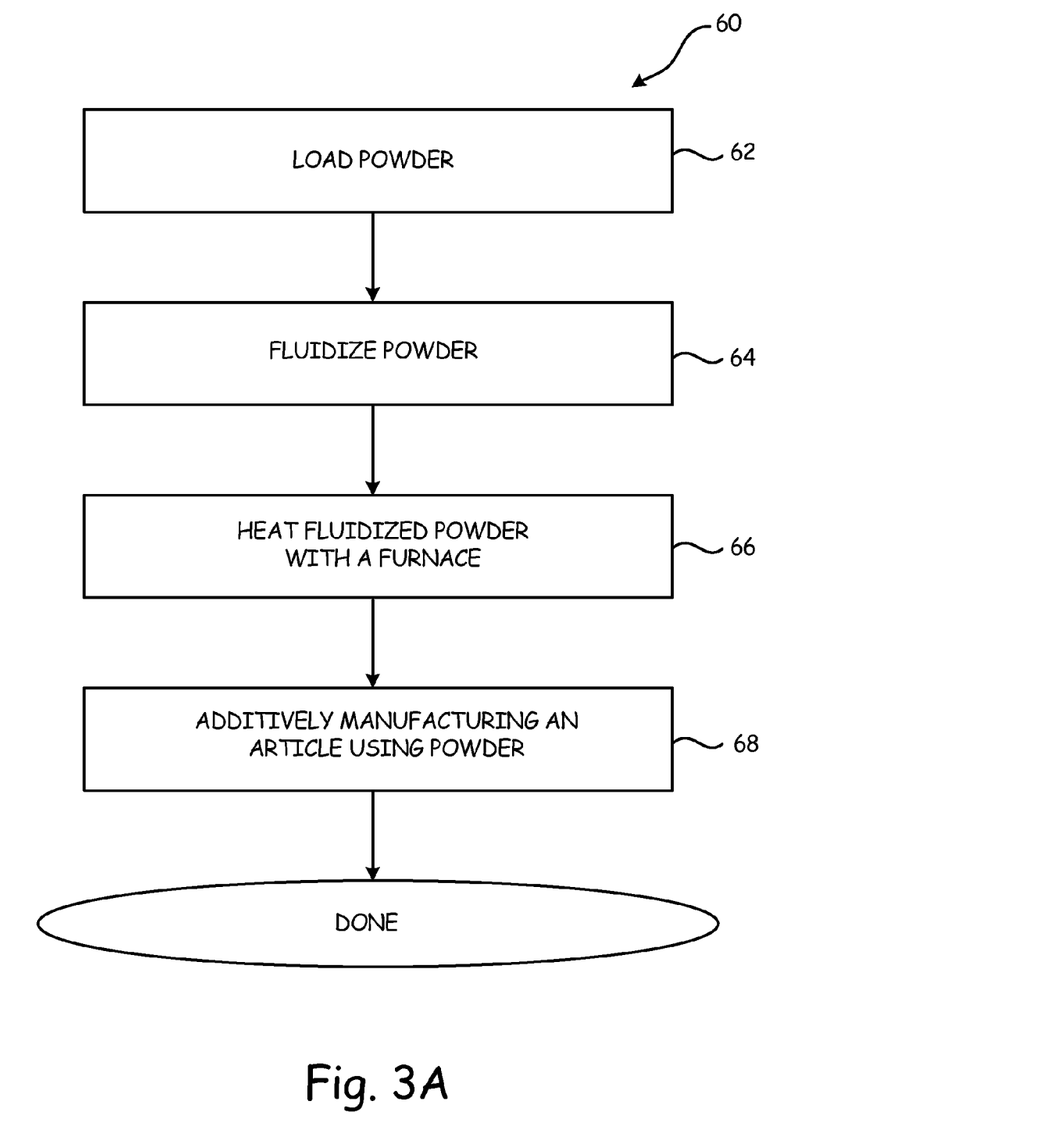
FIG. 3A is a flowchart illustrating a powder spheroidization method.

FIG. 3A is a flow chart illustrating powder spheroidization method 60. Powder 38 is first loaded into fluidized bed assembly 14 (step 62). Powder 38 can be loaded into fluidized bed assembly 14 in any manner such that powder 38 is placed in inner chamber 24 of fluidized bed assembly 14. For example, powder 38 can be loaded into inner chamber 24 via tube 36 or by removing cover 26. Next, powder 38 is fluidized by introducing gas 40 through plate 32 to agitate powder 38 (step 64). Fluidized powder 38 substantially continuously circulates from plate 32, up toward tube 36, and back down toward plate 32. Fluidized powder 38 is then heated with furnace 12 to a temperature between a temperature at or above which powder 38 softens and below a melting point of powder 38, resulting in powder 38 spheroidizing as described previously (step 66). Powder 38 is fluidized and heated until substantially all of powder 38 particles are spheroidal in shape. Fluidizing powder 38 while heating powder 38 reduces a risk of undesired sintering or agglomerating as detailed previously. Once substantially all powder 38 particles have spheroidized, an article is additively manufactured using spheroidized powder 38 (step 68). Additive manufacturing is any layerwise construction of an article from thin layers of feed material. There are various types of additive manufacturing processes, which include direct metal laser sintering (DMLS), laser sintering, laser melting, electron beam melting, cold spray, binder based powder bed techniques, and stereolithography.

Figure 3B:
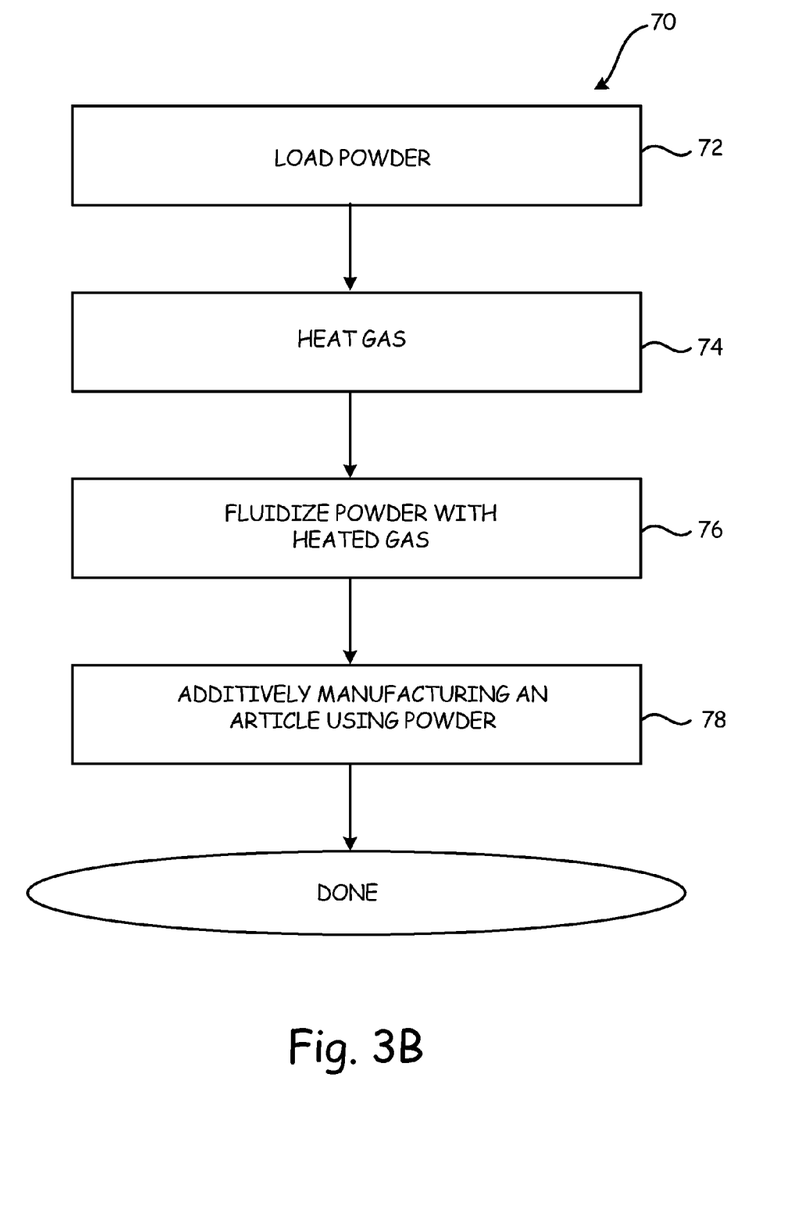
FIG. 3B is a flowchart illustrating another embodiment of a powder spheroidization method.

FIG. 3B is a flow chart illustrating another embodiment of powder spheroidization method 70. Powder 38 is first loaded into fluidized bed assembly 14 (step 72), which can be done in any manner such that powder 38 is placed in inner chamber 24 of fluidized bed assembly 14. Next, gas 40 is heated by gas heater 44, similar to that described for FIG. 2 (step 74). Then, heated gas 40 is used to both fluidize powder 38 as well as heat powder 38 (step 76). As a result, powder 38 is spheroidized while reducing a risk of undesired sintering or agglomerating of powder 38 particles as described previously. Powder 38 is fluidized with heated gas 40 until substantially all powder 38 particles have spheroidized. Once substantially all powder 38 particles have spheroidized, an article can be additively manufactured using powder 38 (step 78).

Example

Figure 4A:
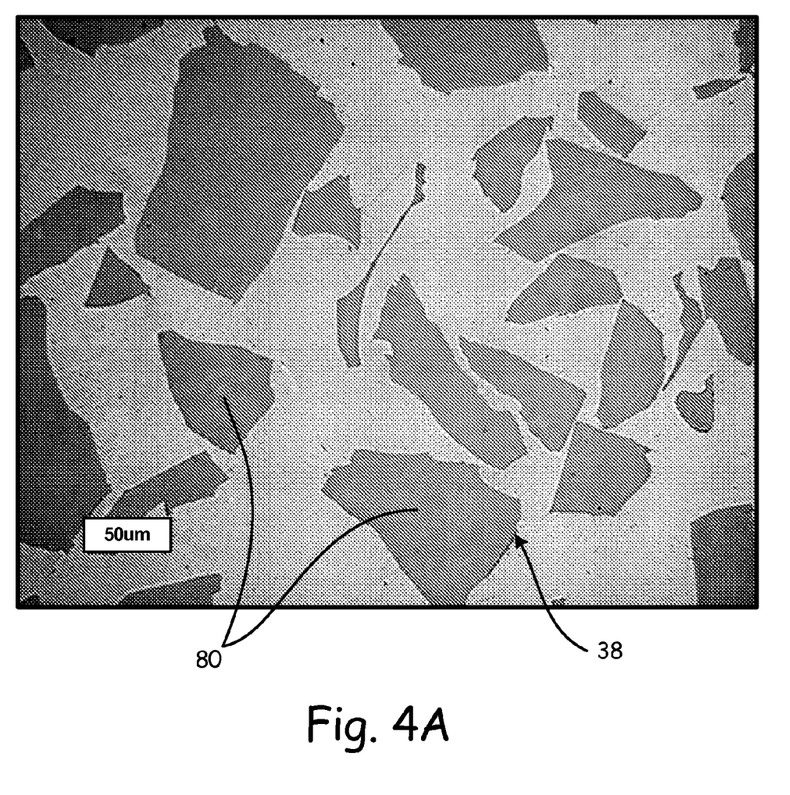
FIG. 4A is a photomicrograph of powder prior to spheroidization.
Figure 4B:
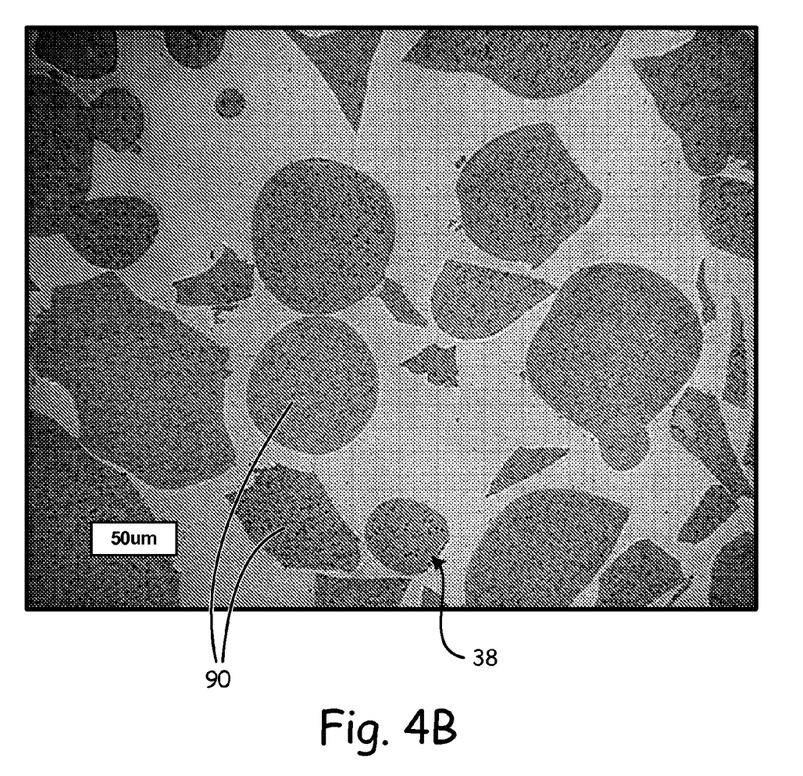
FIG. 4B is a photomicrograph of the powder of FIG. 4A after spheroidization in a powder spheroidizing apparatus.

FIGS. 4A and 4B illustrate powder 38 particles both before and after powder 38 spheroidization in an example experiment performed by the inventors. FIG. 4A is a photomicrograph of powder 38 prior to spheroidization. FIG. 4B is a photomicrograph of powder 38 of FIG. 3A after spheroidization. Both FIGS. 4A and 4B are at a magnification of 50 μm. Included in FIGS. 4A and 4B are pre-spheroidization powder particles 80 and post-spheroidization powder particles 90.

Powder 38 is glass powder available from Specialty Glass Products, Willow Grove, Pa. as SP2688™ with CAS number 65997-17-3. Powder 38 was loaded into fluidized bed assembly 14 in a quantity of 28 grams (0.99 ounces) and a powder 38 particle size distribution ranging from approximately 40 microns (0.0016 inch) to approximately 220 microns (0.0087 inch), with the greatest number of powder 38 particles (10% of the distribution) sized at approximately 100 microns (0.0039 inch). However, more or less powder 38 can be used and the size distribution can vary depending on needs. The powder 38 size distribution can be measured both before and after spheroidization to confirm that no agglomeration or sintering of powder 38 particles has occurred. Powder 38 was fluidized with nitrogen gas 40 at a flow rate of 1.75 liters/minute (0.46 gallon/minute) (under standard conditions of 1 atm and 0° C.). Powder 38 was heated, by placing fluidized bed assembly 14 in furnace 12, to a temperature of 535° C. (995° F.) which resulted in a gas 40 linear velocity of 0.0207 m/s (0.0679 feet/second). This temperature was selected because this is the published glass softening temperature for powder 38. Gas 40 pressure was slightly higher than 1 atm (14.67 lb/in$^2$) to overcome a slight pressure drop at outlet 30. Powder 38 was heated and fluidized in fluidized bed assembly 14 for approximately 12 hours. However, this time can be more of less depending on, among other factors, the quantity of powder and the temperature to which powder 38 is heated. Additionally, various quantities of powder 38 can be loaded into assembly 14 and spheroidized. For example, in some applications up to a kilogram of powder 38 can be loaded into assembly 14, when assembly 14 is large enough to accommodate this quantity of powder 38.

Pre-spheroidization powder particles 80 are sharp or jagged in shape. However, powder 38 was spheroidized such that post-spheroidization powder particles 90 are substantially spheroidal in shape.

Spheroidized particles 90 can then be used to additively manufacture an article. Spheroidized particles 90 provide better powder 38 flow during an additive build because particles 90 generally do not interlock as particles 80 tend to do. As a result, a more consistent article can be additively built using powder 38 spheroidized particles 90.

Discussion of Possible Embodiments

The following are non-exclusive descriptions of possible embodiments of the present invention.

A powder spheroidizing method comprising loading a powder into a fluidized bed assembly; fluidizing at least some of the powder in the fluidized bed assembly using an inert gas; and heating the powder while fluidized in the fluidized bed assembly.

The method of the preceding paragraph can optionally include, additionally and/or alternatively, any one or more of the following techniques, steps, features and/or configurations:

The powder is heated by a furnace within which the fluidized bed assembly is positioned.

The powder is heated by the inert gas which is heated by a gas heater.

The powder is heated to a temperature below a melting point of the powder.

The powder is heated to a temperature at or above a temperature at which the powder soften.

The powder is heated until substantially all particles of the powder are spheroidized.

Removing the powder from the fluidized bed assembly.

Additively manufacturing an article using the powder removed from the fluidized bed assembly.

The inert gas is introduced into an outer chamber of the fluidized bed assembly and enters an inner chamber of the fluidized bed assembly where the inert gas fluidizes at least some of the powder.

A powder spheroidizing apparatus for spheroidizing a powder, the apparatus comprising a fluidized bed assembly; a heat source for introducing heat into the fluidized bed assembly; a powder within the fluidized bed assembly; and a plate disposed within the fluidized bed assembly.

The apparatus of the preceding paragraph can optionally include, additionally and/or alternatively, any one or more of the following features, configurations and/or additional components:

The powder is selected from a group consisting essentially of: metal, ceramic, glass, and polymer powder.

The plate is disposed within an inner chamber of the fluidized bed assembly.

The fluidized bed assembly further comprises an outer chamber with an inlet; and the inner chamber positioned inside of the outer chamber, wherein the inner chamber is in fluid communication with the outer chamber, wherein a fluidizing gas is introduced through the inlet of the outer chamber.

The heat source is a gas heater through which the fluidized gas is passed before entering the inlet of the outer chamber.

The fluidizing gas is an inert gas.

The inert gas is selected from the group consisting of nitrogen and argon.

The heat source is a furnace within which at least a portion of the fluidized bed assembly is positioned.

A method for spheroidizing powder, the method comprising loading a powder into a fluidized bed assembly; fluidizing at least some of the powder in the fluidized bed assembly using an inert gas; heating the powder while fluidized in the fluidized bed assembly to a temperature ranging between a temperature at or above which the powder softens and below a melting point of the powder, wherein the powder is heated until substantially all particles of the powder are spheroidized; removing the powder from the fluidized bed assembly; and additively manufacturing an article using the powder removed from the fluidized bed assembly.

The method of the preceding paragraph can optionally include, additionally and/or alternatively, any one or more of the following techniques, steps, features and/or configurations:

The powder is heated by a furnace within which the fluidized bed assembly is positioned.

The powder is heated by the inert gas which is heated by a gas heater.

Any relative terms or terms of degree used herein, such as "generally", "substantially", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

Although the present invention has been described with reference to preferred embodiments, workers skilled in the art will recognize that changes may be made in form and detail without departing from the spirit and scope of the invention.

The invention claimed is:

1. A powder spheroidizing method comprising:
loading a powder into a fluidized bed assembly;
fluidizing at least some of the powder in the fluidized bed assembly using an inert gas introduced into a fluidized bed chamber through a plate at a bottom portion of the fluidized bed chamber;
heating the powder while fluidized in the fluidized bed assembly; and
circulating the powder within the fluidized bed chamber, wherein the powder is circulated between an outlet at a top portion of the fluidized bed chamber and the plate at a bottom portion of the fluidized bed chamber, and wherein circulating the powder comprises slowing a velocity of the powder near the outlet.

2. The method of claim 1, wherein the powder is heated by a furnace within which the fluidized bed assembly is positioned.

3. The method of claim 1, wherein the powder is heated by the inert gas which is heated by a gas heater.

4. The method of claim 1, wherein the powder is heated to a temperature below a melting point of the powder.

5. The method of claim 4, wherein the powder is heated to a temperature at or above a temperature at which the powder softens.

6. The method of claim 1, wherein the powder is heated until substantially all particles of the powder are spheroidized.

7. The method of claim 1, wherein the fluidized bed chamber is an inner chamber of the fluidized bed assembly and wherein the inert gas is introduced into an outer chamber of the fluidized bed assembly and enters the inner chamber of the fluidized bed assembly.

8. The method of claim 1, wherein the powder is selected from a group consisting essentially of: metal, ceramic, glass, and polymer powder.

9. The method of claim 1, further comprising removing the powder from the fluidized bed assembly.

10. The method of claim 9, further comprising additively manufacturing an article using the powder removed from the fluidized bed assembly.

11. The method of claim 9, wherein removing the powder from the fluidized bed assembly comprises increasing a velocity of the inert gas in the fluidized bed chamber.

12. The method of claim 11, wherein removing the powder from the fluidized bed assembly further comprises evacuating the powder through the outlet at a top portion of the fluidized bed chamber.

13. A method for spheroidizing powder, the method comprising:
loading a powder into a fluidized bed assembly;
fluidizing at least some of the powder in the fluidized bed assembly using an inert gas introduced into a fluidized bed chamber through a plate at a bottom portion of the fluidized bed chamber;
heating the powder while fluidized in the fluidized bed assembly to a temperature ranging between a temperature at or above which the powder softens and below a melting point of the powder, wherein the powder is heated until substantially all particles of the powder are spheroidized;
circulating the powder within the fluidized bed chamber, wherein the powder is circulated between an outlet at a top portion of the fluidized bed chamber and the plate at a bottom portion of the fluidized bed chamber, and wherein circulating the powder comprises slowing a velocity of the powder near the outlet;
removing the powder from the fluidized bed assembly; and
additively manufacturing an article using the powder removed from the fluidized bed assembly.

14. The method of claim 13, wherein the powder is heated by a furnace within which the fluidized bed assembly is positioned.

15. The method of claim 13, wherein the powder is heated by the inert gas which is heated by a gas heater.

* * * * *